US012572896B2

(12) United States Patent
Wang et al.

(10) Patent No.: US 12,572,896 B2
(45) Date of Patent: Mar. 10, 2026

(54) PROCESSING A USER TASK

(71) Applicant: Beijing Zitiao Network Technology Co., Ltd., Beijing (CN)

(72) Inventors: Linlin Wang, Beijing (CN); Wenliang He, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/634,744

(22) Filed: Apr. 12, 2024

(65) Prior Publication Data

US 2025/0138890 A1 May 1, 2025

(30) Foreign Application Priority Data

Oct. 27, 2023 (CN) .......................... 202311415811.3

(51) Int. Cl.
G06Q 10/109 (2023.01)
G06F 9/451 (2018.01)
H04L 12/28 (2006.01)

(52) U.S. Cl.
CPC ........... G06Q 10/109 (2013.01); G06F 9/453 (2018.02); G06Q 10/1097 (2013.01); H04L 12/282 (2013.01); G05B 2219/163 (2013.01)

(58) Field of Classification Search
None
See application file for complete search history.

(56) References Cited

U.S. PATENT DOCUMENTS

| | | | |
|---|---|---|---|
| 2016/0110347 A1 | 4/2016 | Kennewick, Jr. et al. | |
| 2019/0129938 A1* | 5/2019 | Yao ........................ | H04L 12/282 |

FOREIGN PATENT DOCUMENTS

| | | |
|---|---|---|
| CN | 109725961 | 5/2019 |
| CN | 110853645 | 2/2020 |
| CN | 115810355 | 6/2022 |
| CN | 114661899 | 3/2023 |
| CN | 115858119 | 3/2023 |
| EP | 3959713 | 3/2022 |

OTHER PUBLICATIONS

English Translation of CN115858119. (Year: 2023).*
English Translation of CN109725961. (Year: 2019).*
International Search Report in International Appln. No. PCT/CN2024/081050, mailed on Jun. 13, 2024, 5 pages (with English translation).

* cited by examiner

*Primary Examiner* — Qing Yuan Wu
(74) *Attorney, Agent, or Firm* — Fish & Richardson P.C.

(57) ABSTRACT

A method, apparatus, device, and medium for processing a user task are provided. In one method, a user input represented in a natural language is received from a user. The user input indicates a task to be executed. A task type of the task is determined based on the user input. In response to determining that the task type indicates an execution result of the task is unable to be obtained within a predetermined time period, a subsequent task of the task is created to provide the execution result of the task by a machine learning model when a triggering condition for the task is met. With exemplary implementations of the present disclosure, user tasks that cannot obtain the execution result of the task within a predetermined time period can be processed in a more flexible and efficient manner.

19 Claims, 5 Drawing Sheets

300

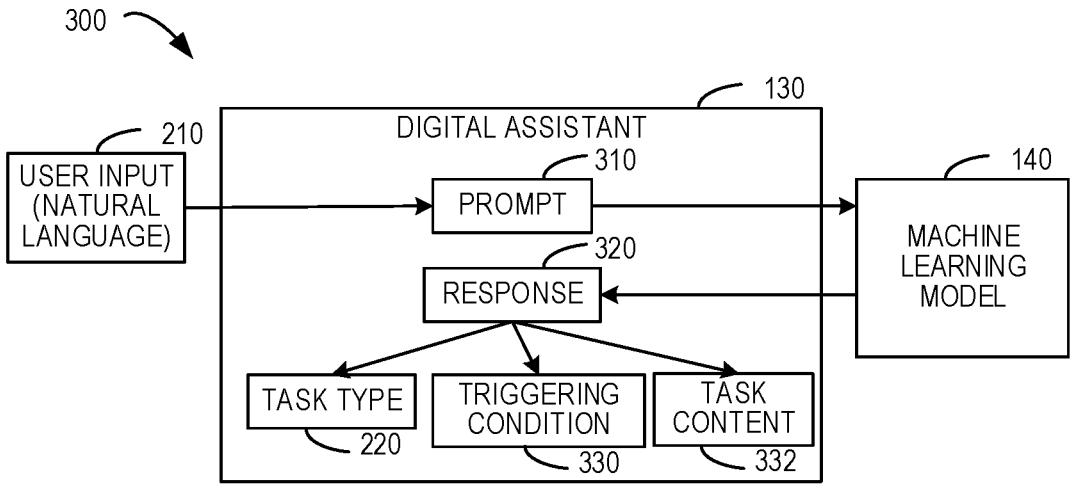

DIGITAL ASSISTANT 130

USER INPUT (NATURAL LANGUAGE) 210

PROMPT 310

RESPONSE 320

TASK TYPE 220

TRIGGERING CONDITION 330

TASK CONTENT 332

MACHINE LEARNING MODEL 140

422 TRIGGERING CONDITION

410 SESSION

420 USER INPUT

PLEASE PROVIDE A WEATHER FORECAST FOR BEIJING AT 8 A.M. TOMORROW

"AT 8 A.M. TOMORROW"

424 TASK CONTENT

"PROVIDE A WEATHER FORECAST FOR BEIJING"

450 SUBSEQUENT TASK (DELAY TYPE)

430 RESPONSE

A SUBSEQUENT TASK HAVE BEEN CREATED FOR YOU

...

440 EXECUTION RESULT

THE TIME NOW IS 8 A.M. ON OCT. 25TH. THE WEATHER IN BEIJING IS FINE...

FIG. 4

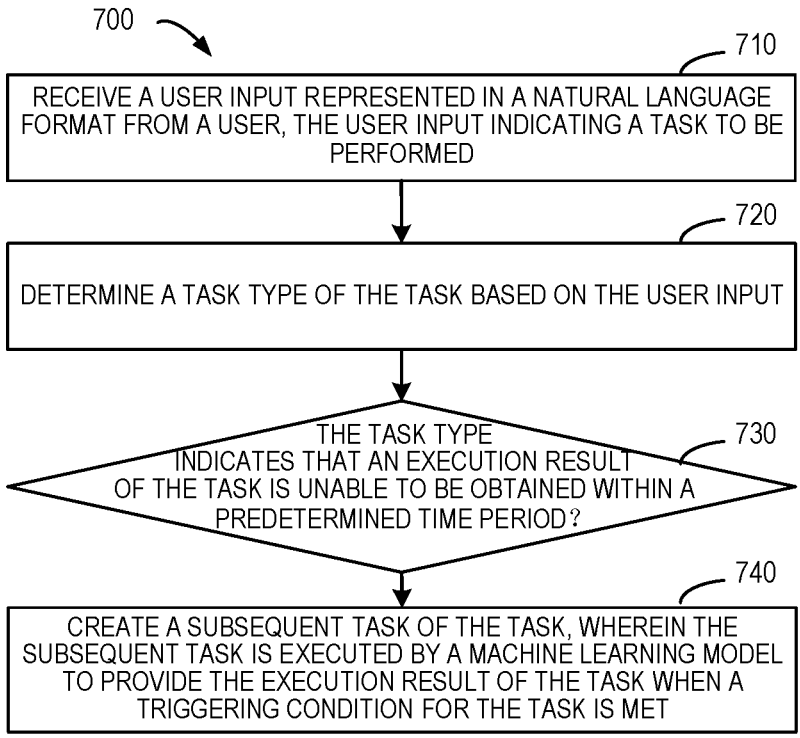

700

710

RECEIVE A USER INPUT REPRESENTED IN A NATURAL LANGUAGE FORMAT FROM A USER, THE USER INPUT INDICATING A TASK TO BE PERFORMED

720

DETERMINE A TASK TYPE OF THE TASK BASED ON THE USER INPUT

730

THE TASK TYPE INDICATES THAT AN EXECUTION RESULT OF THE TASK IS UNABLE TO BE OBTAINED WITHIN A PREDETERMINED TIME PERIOD?

740

CREATE A SUBSEQUENT TASK OF THE TASK, WHEREIN THE SUBSEQUENT TASK IS EXECUTED BY A MACHINE LEARNING MODEL TO PROVIDE THE EXECUTION RESULT OF THE TASK WHEN A TRIGGERING CONDITION FOR THE TASK IS MET

FIG. 7

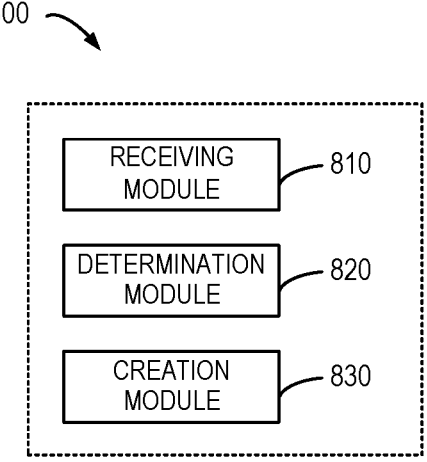

800

RECEIVING MODULE — 810

DETERMINATION MODULE — 820

CREATION MODULE — 830

FIG. 8

PROCESSING A USER TASK

CLAIM OF PRIORITY

This application claims priority China Patent Application Serial No. 202311415811.3 filed on Oct. 27, 2023 titled "METHOD, APPARATUS, DEVINCE AND MEDIUM FOR PROCESSING USER TASK", the entire contents of which are hereby incorporated by reference.

FIELD

Implementations of the present specification generally relate to processing a user task, and more particularly to processing a user task that does not immediately provide an execution result by a machine learning model.

BACKGROUND

Machine learning technology has been widely used in various fields. In existing solutions, machine learning models can understand a user's language input, interact with the user in real time, and generate appropriate responses. Machine learning models can usually call various built-in or third-party tools to execute tasks. However, for some tasks, the execution results cannot be obtained within a predetermined time period. Additionally, the users typically need to maintain a dialogue with the machine learning model at all times, which may prevent the users from executing other tasks, thereby causing unnecessary resource waste and other issues.

SUMMARY

In a first aspect of the present disclosure, a method for processing a user task is provided. In this method, a user input represented in a natural language is received from a user. The user input indicates a task to be executed. A task type of the task is determined based on the user input. In response to determining that the task type indicates an execution result of the task is unable to be obtained within a predetermined time period, a subsequent task of the task is created to provide the execution result of the task by a machine learning model when a triggering condition for the task is met.

In a second aspect of the present disclosure, an apparatus for processing a user task is provided. The apparatus includes: a receiving module configured to receive a user input represented in a natural language from a user, the user input indicating a task to be executed; a determination module configured to determine a task type of the task based on the user input; and a creation module configured to, in response to determining that the task type indicates an execution result of the task is unable to be obtained within a predetermined time period, create a subsequent task of the task to provide the execution result of the task by a machine learning model when a triggering condition for the task is met.

In a third aspect of the present disclosure, an electronic device is provided. The electronic device includes: at least one processing unit; and at least one memory, the at least one memory being coupled to the at least one processing unit and storing instructions for execution by the at least one processing unit, the instructions, when executed by the at least one processing unit, causing the electronic device to execute the method according to the first aspect of the present disclosure.

In a fourth aspect of the present disclosure, there is provided a computer readable storage medium having stored thereon a computer program that, when executed by a processor, causes the processor to implement the method according to the first aspect of the present disclosure.

It should be understood that the content described in this section is neither intended to limit the key features or important features of the implementations of the present disclosure, nor is it intended to limit the scope of the present disclosure. Other features of the present disclosure will become readily understood through the following description.

BRIEF DESCRIPTION OF THE DRAWINGS

In the following text, the above and other features, advantages, and aspects of each implementation of the present disclosure will become more apparent in conjunction with the accompanying drawings and with reference to the following detailed description. In the drawings, the same or similar reference numerals indicate the same or similar elements, where:

FIG. 3 illustrates a block diagram of an example process for determining a task type, triggering condition, and task content of a task.

FIG. 4 illustrates a block diagram of an example of creating a subsequent task.

FIG. 7 illustrates a flowchart of an example method for processing a user task.

FIG. 8 illustrates a block diagram of an example apparatus for processing a user task.

DETAILED DESCRIPTION

Figure 1:
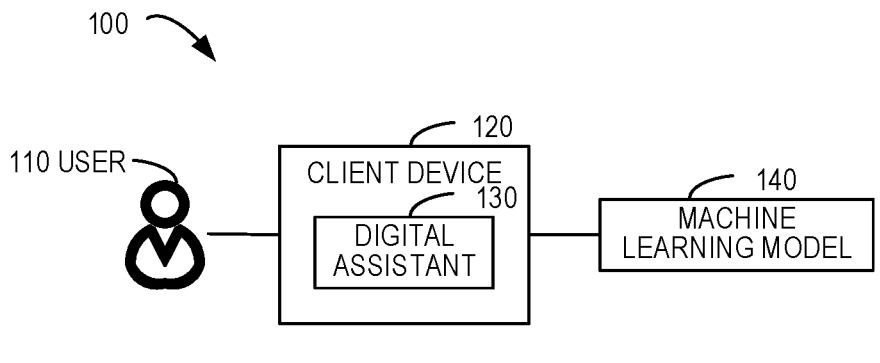
FIG. 1 illustrates a block diagram of an example application environment.

Implementations of the present specification will be described in more detail below with reference to the accompanying drawings. Although some implementations of the present disclosure are shown in the drawings, it would be appreciated that the present disclosure can be implemented in various forms and should not be interpreted as limited to the implementations described herein. On the contrary, these implementations are provided for a more thorough and complete understanding of the present disclosure. It would be appreciated that the drawings and implementations of the present disclosure are only for illustrative purposes and are not intended to limit the scope of protection of the present disclosure.

Example Environment

A machine learning model can be configured and trained to interpret a user's natural language input, interact with the user in substantially real time, and generate appropriate responses from the model output. FIG. 1 illustrates a block diagram 100 of an example application environment that can be implemented according to one or more implementations of the present disclosure. As shown in FIG. 1, a user 110 may access a machine learning model 140 via a client device 120. Specifically, the user 110 may call the machine learning model 140 via a user interface of the machine learning model 140; alternatively, and/or additionally, the machine learning model 140 may be called via a digital assistant 130 (such as a client application) installed at the client device 120.

Furthermore, the machine learning model 140 may call various built-in or third-party tools to execute tasks. These tools may be functions, APIs, microservices, or other programs that may accomplish specific tasks. By calling these tools, the machine learning model 140 may execute various tasks, such as obtaining weather forecasts, searching for information, and calculating data. When the machine learning model 140 receives a user request, it may first parse the user's input, determine the user's needs, and then select an appropriate tool to execute the task based on the determined needs. For example, the machine learning model 140 may call one or more tools for weather forecasting to provide weather information, call one or more search tools to return expected search results responsive to the received user request, and so on. The execution of tasks may require multiple interactions between the machine learning model and the tool, such as sending requests, receiving responses, and processing results.

However, current machine learning models mainly rely on dialogue interaction in which identified tasks are contemporaneously processed during the user interaction with the machine learning model. As a result, the machine learning models cannot process tasks that need to be executed at specific times or conditions in the future separate from the user interaction session. For example, users may want to receive weather forecasts at 8 a.m. every day or receive reminders when a battery level is below 20%, etc. The users cannot obtain execution results at a predetermined time of the current session, and they would need to maintain the dialogue interaction with the machine learning model continuously until the task is executed. In other words, existing machine learning models cannot meet these needs because they cannot execute tasks without user interaction. This greatly limits the functionality and application field of machine learning models. This specification describes techniques for processing user tasks that cannot obtain execution results within the predetermined time period in a more flexible and effective manner.

Summary of Processing User Task

Figure 2:
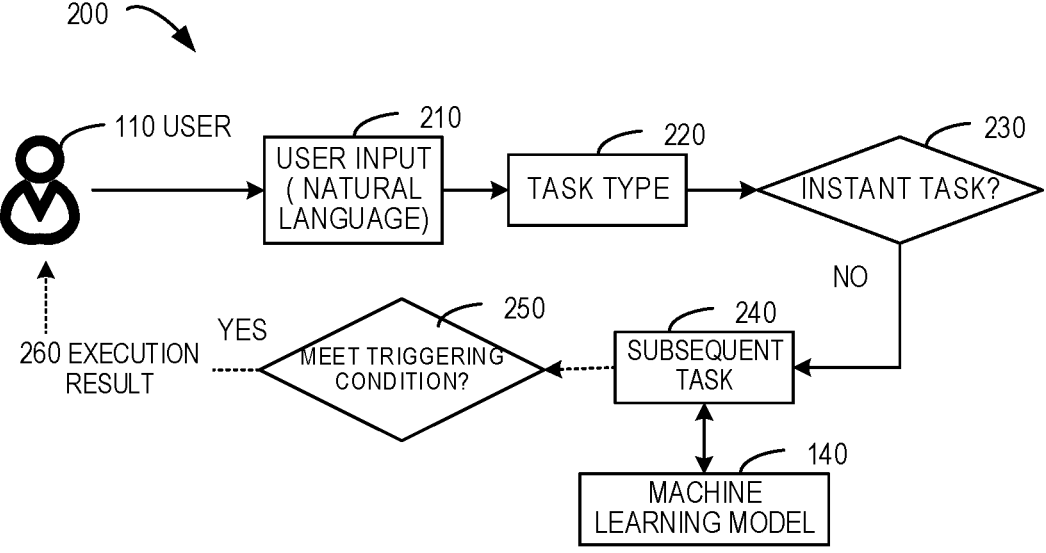
FIG. 2 illustrates a block diagram of an example process for processing a user task.

In order to at least partially address the shortcomings in existing solutions, a method for processing a user task is proposed according to implementations of the present disclosure. Referring to FIG. 2, a summary of an implementation of the present disclosure is described. FIG. 2 illustrates a block diagram 200 of an example process for processing a user task according to some implementations of the present disclosure. As shown in FIG. 2, a user input 210, represented in a natural language, from the user 110 may be received. In particular, the user input 210 may indicate a task to be executed. For example, the user input 210 may include: "Please provide a weather forecast for Beijing at 8 a.m. tomorrow", "Please provide weather forecasts for 100 cities nationwide", and so on.

A task type 220 of the task may be determined based on the user input 210. Here, the task type 220 may include instant tasks and non-instant tasks. For example, instant tasks may represent tasks that may obtain execution results within a predetermined time period (such as 1 second, 5 seconds, or other lengths), and non-instant tasks may represent tasks that cannot obtain execution results within the predetermined time period. If the judgment result at block 230 is "No", a subsequent task 240 of the task may be created. If the judgment result is "Yes", the task may be directly executed.

It should be understood that the subsequent task 240 may indicate that the task is not executed immediately at present, but the execution result of the task is provided by the machine learning model 140 when the triggering condition of the task is met. As shown at block 250, if the triggering condition of the task is met, an execution result 260 of the task is provided to the user 110. Specifically, assuming that the user input 210 as "please provide a weather forecast for Beijing at 8 a.m. tomorrow", the triggering condition may be "8 a.m. tomorrow", and when the current time reaches 8 a.m. the next day, the weather forecast for Beijing is provided to the user 110. For another example, assuming that the user input 210 as "please provide weather forecasts for 100 cities nationwide", it will take some time to execute the task, so the triggering condition may be "when the task is completed", providing the weather forecasts for 100 cities nationwide to the user 110.

With the exemplary implementations of the present disclosure, the subsequent task 240 may be used to provide the execution results of the task when the triggering condition of the task is met. In this way, it is not necessary for the user to continually maintain a dialogue with the machine learning model until the task is executed, and the execution results of the task may be provided without the user initiating a subsequent interaction with the machine learning model.

Detailed Process for Processing User Task

The summary of an implementation according to the present disclosure has been described, and more details about processing a user task are described below. According to some implementations, the method may be executed in the digital assistant 130. Here, the digital assistant 130 may be a pre-created application that may call the machine learning model 140, and the digital assistant 130 may act as an intermediary between the user and the machine learning model 140, thereby calling the comprehensive processing capabilities of the machine learning model 140 to serve the user 110.

According to some implementations of the present disclosure, the digital assistant 130 may receive the user input 210 represented in the natural language from the user. The task type 110 that determines the task represented by the user input 210 may be executed locally at the digital assistant 130. For example, the task type 110 may be determined by algorithms such as language analysis. Alternatively, and/or additionally, the ability of the machine learning model 140 may be called by the digital assistant 130 to determine the task type 220. Here, the machine learning model 140 may be a large language model (LLM).

FIG. 3 illustrates a block diagram 300 of an example process for determining a task type, triggering condition, and task content of a task according to some implementations of the present disclosure. As shown in FIG. 3, in the process of determining the task type 220, a prompt (e.g., referred to as a first prompt) 310 may be generated based on the user input 210. Here, the prompt 310 may instruct the machine learning model 140 to determine the task type 220. The prompt may be determined based on various methods currently known. Further, the prompt 310 may be provided to the machine learning model 140 and a response 320 may be received from the machine learning model 140. The task type 220 may be determined based on the response 320 of the machine learning model. In this way, the complexity of the digital assistant 130 may be simplified, and the powerful processing power of the machine learning model 140 may be called to determine the task type in a more accurate manner.

According to some implementations of the present disclosure, the powerful ability of the machine learning model 140 may be further utilized to determine the triggering condition and/or a task content for the task from the user input 210. Here, the triggering condition may represent a condition used to trigger the execution results of the task, such as "8 a.m. tomorrow" and "when the task is completed" in the previous example. Furthermore, the task content may define the specific content of the task to be executed, such as "providing a weather forecast for Beijing" and "providing weather forecasts for 100 cities nationwide" in the previous example.

At this time, the corresponding prompt may be built, and the prompt may further instruct the machine learning model 140 to determine the triggering condition and the task content for the task. At this time, the response 320 from the machine learning model 140 will include relevant information about the triggering condition and task content, and the triggering condition 330 and task content 332 of the task may be determined based on the response 320. In this way, the complexity of the digital assistant 130 may be simplified, and the powerful processing power of the machine learning model 140 may be called to provide more accurate triggering conditions and task content.

According to some implementations of the present disclosure, the subsequent task 240 derived from the original task may be created based on the triggering condition 330 and the task content 332, so that the subsequent task 240 may execute the specified task content 332 by the machine learning model 140 when the triggering condition 330 of the task is met, and then provide the execution results of the subsequent? task. Specifically, in the process of creating the subsequent task for the task based on the triggering condition 330 and the task content 332 of the task, another prompt (e.g., referred to as a second prompt) may be generated for the task content 332. Here, the second prompt may instruct the machine learning model 140 to execute the task content. Further, the subsequent task may be configured to provide the second prompt to the machine learning model based on the triggering condition.

Referring to FIG. 4 for more details on creating a subsequent task, which illustrates a block diagram 400 showing an example of creating a subsequent task according to some implementations of the present disclosure. As shown in FIG. 4, a session 410 may be provided between the user and the digital assistant, with the left side of a user interface representing the user and the right side of the user interface representing the digital assistant. For example, the user input 420 may indicate: "please provide a weather forecast for Beijing at 8 a.m. tomorrow". At this point, the digital assistant 130 may call on the capabilities of the machine learning model 140 to determine: a triggering condition 422 is "at 8 a.m. tomorrow", and a task content 424 is "provide a weather forecast for Beijing". Furthermore, a subsequent task 450 may be created locally at the digital assistant 130. In this way, without modifying the machine learning model, the function of processing non-instant tasks may be completed by adding a processing interface locally at the digital assistant 130.

According to some implementations of the present disclosure, in the process of configuring the subsequent task, in response to a determination that the triggering condition indicates that the execution result of the task is to be provided at a predetermined future time point, the second prompt may be provided to the machine learning model, e.g., by the digital assistant, at the predetermined future time point. In this example, the triggering condition explicitly specifies a future time point, at which time a delay type subsequent task 450 may be created. According to an example implementation of the present disclosure, the delay type may represent that the task is not executed and the execution result is not provided immediately, but the execution of the task is delayed and the task is executed when the current time reaches the specified future time point. In this way, the task may be executed at an appropriate time point that meets the user's need, thereby providing the execution result.

According to an example implementation of the present disclosure, the digital assistant 130 may provide a response 430, e.g., within a user interface presenting the dialogue interaction of the user with the digital assistant, to indicate to the user that the user request has been received and that the execution result of the task will be provided later. Specifically, a prompt may be created based on the task content 424, such as "please provide a weather forecast for Beijing".

According to some implementations of the present disclosure, the subsequent task may be executed to provide an execution result when the triggering condition is met. Specifically, the prompt may be sent to the machine learning model 140 when the current time point reaches 8 a.m. the next day. Furthermore, the machine learning model 140 may quickly call a weather forecast tool to query the weather forecast for Beijing and provide a response to the digital assistant 130 upon receiving the prompt. In this way, the user may ensure that they obtain the execution result at the specified future time point by delaying the task.

Then, an execution result 440 may be returned to the user based on the response of the machine learning model 140. For example, the current time may be presented at the head of the execution result 440, and then the weather forecast for Beijing may be provided. It should be understood that the response of the machine learning model 140 is rapid and may ensure that the user obtains the execution result at substantially the specified time point. Alternatively, and/or additionally, the triggering condition 422 may be adjusted, such as adjusting the predetermined time point to be earlier by 1 second (or other time length). At this time, a prompt may be provided to the machine learning model 140 at 07:59:59 a.m. the next day to ensure that the user receives the weather forecast at 08:00 a.m.

It should be understood that although the user input described above only involves creating one subsequent task, alternatively and/or additionally, the user input may involve a plurality of subsequent tasks. For example, the user input may represent "provide a weather forecast for Beijing at 8 a.m. every day". At this time, a cyclic subsequent task may be created at the digital assistant 130, that is, sending prompts to the machine learning model at 8 a.m. every day to obtain Beijing's weather forecast.

Figure 5:
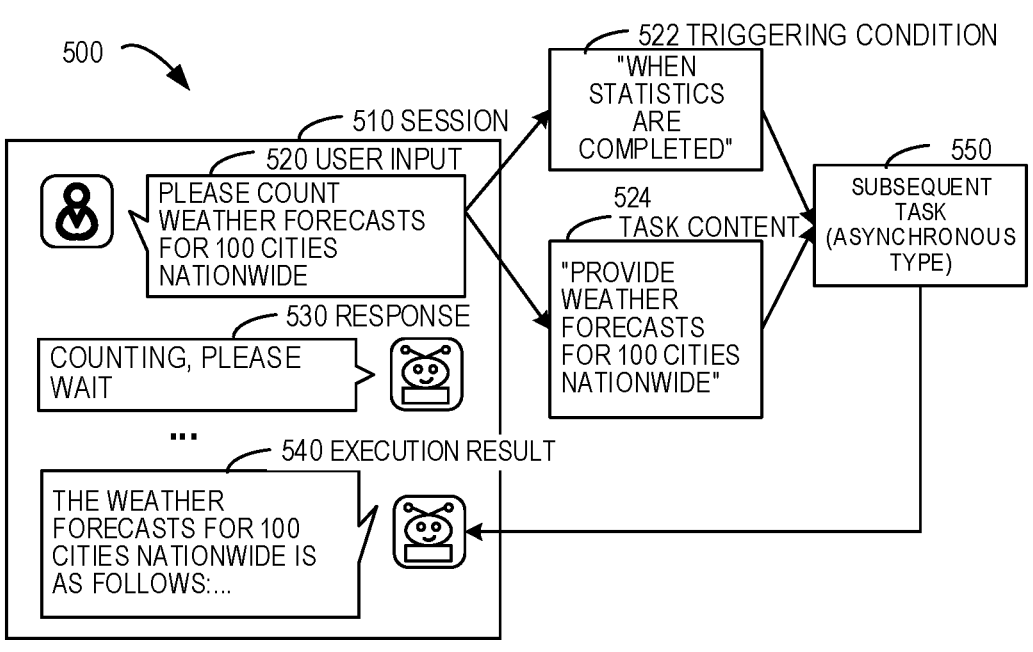
FIG. 5 illustrates a block diagram of an example of creating a subsequent task.

Referring to FIG. 4, the case of the triggering condition involving the predetermined future time point has been described. Alternatively, and/or additionally, the triggering condition may also involve "task completion". Referring to FIG. 5 for more details, FIG. 5 illustrates a block diagram 500 showing an example of creating a subsequent task according to some implementations of the present disclosure. As shown in FIG. 5, a session 510 may be provided between the user and the digital assistant. For example, a user input 520 may be represented as: "Please count weather forecasts for 100 cities nationwide". At this time, the digital assistant 130 may call the ability of the machine learning model 140 to determine: a triggering condition 522 corresponding to; "when statistics are completed", and a task content 524 corresponding to: "provide weather forecasts for 100 cities nationwide". Further, a subsequent task 550 may be created locally at the digital assistant 130.

According to some implementations of the present disclosure, in the process of configuring subsequent tasks, if it is determined that the triggering condition indicates providing the execution result of the task when it is completed, the triggering condition thereby indicates that executing the task will take a long time. Consequently, the prompt may be immediately provided to the machine learning model. In order to avoid a long waiting time by the user, a response 530 may be provided to provide feedback to the user on the user input 520 to indicate that the user input is being processed.

In this example, the triggering condition does not explicitly specify a future time point, and an asynchronous type of subsequent task 550 may be created at this time. According to some implementations of the present disclosure, the asynchronous type of subsequent task may represent that the execution result cannot be provided immediately, but based on the callback message from the machine learning model, the execution result is provided when the task is completed. In this way, the execution result may be provided immediately when the task is completed. The digital assistant 130 may provide the user with the weather forecasts for 100 cities nationwide based on the response from the machine learning model. In this way, the user does not need to keep the session 510 open and wait for a long time, but may obtain the execution result immediately when the task is completed through the asynchronous task.

According to some implementations of the present disclosure, the digital assistant 130 may be a client tool created by the user 110 and/or other users to communicate with the machine learning model. The digital assistant 130 may include a preset task, that is, the preset task is added to the digital assistant 130 during the creation of the digital assistant 130. See FIG. 6 for more details on creating the digital assistant 130, which illustrates a block diagram 600 of a process of adding a preset task during the creation of a digital assistant according to some implementations of the present disclosure.

Figure 6:
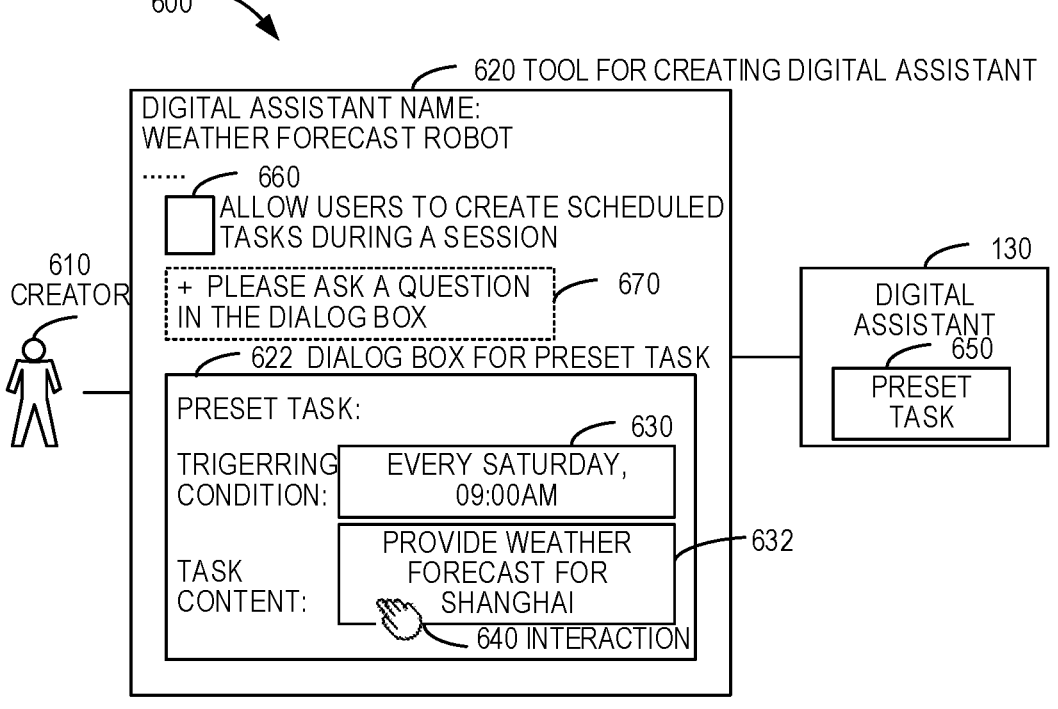
FIG. 6 illustrates a block diagram of an example process of adding a preset task in the process of creating a digital assistant.

As shown in FIG. 6, a creator 610 may use a tool 620 for creating digital assistants to create the digital assistant 130. The tool 620 for creating digital assistants, can include a control 660 that indicates whether to allow the user of the generated digital assistant 130 to create a subsequent task during the session. Specifically, if the control 660 is not selected, the digital assistant 130 will operate in a conventional manner.

If the control 660 is selected, it allows users to create a scheduling task in the natural language during a session with the digital assistant 130. At this time, the digital assistant 130 may operate according to the process described above when receiving the user input. For example, based on the user input, a corresponding prompt is generated, and based on the machine learning model's reply to the prompt, it is determined whether a subsequent task needs to be created. If it is determined that the task specified by the user input belongs to a non-instant task, a subsequent task is created. For example, if the digital assistant 130 receives the user input "please provide a weather forecast for Beijing at 8 a.m. tomorrow", the digital assistant 130 will create subsequent tasks in the manner described above, and provide the weather forecast at 8 a.m. the next day. Alternatively, and/or additionally, if the control 660 is selected, the creator may further use a control 670 to set reminder statements. For example, "please ask a question in the dialog box" may be set. At this time, when the digital assistant interacts with the user for the first time, it will remind the user to set a task through the dialog box.

Alternatively, and/or additionally, during the creation of the digital assistant 130, a dialog box 622 for a preset task may be called to add a preset task to the digital assistant. For example, the creator 610 may execute an interaction 640, may enter a triggering condition for the preset task in box 630, and may enter a task content of the preset task in box 632, and so on. At this time, a preset task 650 will be included in the created digital assistant 130.

According to an example implementation of the present disclosure, the user of the digital assistant 130 may select to activate or disable the preset task 650. If it is determined that the preset task 650 is activated, the triggering condition of the preset task may be determined. At this time, the triggering condition may be determined locally at the digital assistant 130 (such as reading from local storage, etc.). Furthermore, a subsequent task of the preset task may be created to provide the execution result of the preset task based on the machine learning model when the triggering condition of the preset task is met. In this way, the machine learning model can receive user tasks in a more diverse way, thereby receiving user input in a more convenient and efficient manner.

According to some implementations of the present disclosure, the preset task may be processed in a manner similar to that described above. Specifically, if the triggering condition of the preset task indicates that the execution result of the preset task will be provided at a predetermined future time point, the preset task may be processed in a manner similar to FIG. 4. Specifically, a prompt (e.g., called a third prompt) may be generated based on the preset task, which may indicate that the task content of the preset task may be executed by calling the machine learning model. In the example of FIG. 6, an example prompt may be: "provide a weather forecast for Shanghai".

Furthermore, a subsequent task of the preset task may be configured so that the generated prompt is provided to the machine learning model at a future time point (e.g., 09:00 a.m. every Saturday). Subsequently, the subsequent task of the preset task may be executed to provide the execution result based on a response of the machine learning model to the prompt. At each future time point, the machine learning model will receive the prompt "provide a weather forecast for Shanghai" (e.g., at 09:00 a.m. every Saturday), and return the weather forecast for Shanghai to the digital assistant 130. In this way, the machine learning model may be called regularly at the digital assistant 130 to complete the preset task. Alternatively and/or additionally, another time point may be determined based on the future time point, such as sending the prompt to the machine learning model at 08:59:59 a.m. (or other time points) one second in advance, so that the user may receive the response to the prompt on time.

With the example implementations of the present disclosure, a new way of calling a machine learning model to process user tasks is provided. In this way, user tasks that cannot obtain execution results within a predetermined time period may be processed more flexibly and efficiently by creating delayed tasks and asynchronous tasks.

Example Process

FIG. 7 illustrates a flowchart of an example method 700 for processing a user task. At block 710, a user input represented in a natural language format is received from a user. The user input indicates a task to be executed. At block 720, a task type of the task is determined based on the user input. At block 730, it is determined whether the task type indicates that an execution result of the task is unable to be obtained within a predetermined time period. If the result of the determination at block 730 is "yes", the method 700 proceeds to block 740. At block 740, a subsequent task of the task is created to provide the execution result of the task by a machine learning model when a triggering condition for the task is met.

According to some implementations of the present disclosure, determining the task type includes: generating, based on the user input, a first prompt instructing the machine learning model to determine the task type; providing the first prompt to the machine learning model; and determining the task type based on a first response of the machine learning model for the first prompt.

According to some implementations of the present disclosure, the first prompt further instructs the machine learning model to determine the triggering condition and a task content for the task. Creating the subsequent task comprises: determining, based on the first response, the triggering condition and the task content for the task; and creating the subsequent task of the task based on the triggering condition and the task content.

According to some implementations of the present disclosure, creating the subsequent task of the task based on the triggering condition and the task content comprises: generating, based on the task content, a second prompt instructing the machine learning model to execute the task content; and configuring the subsequent task to provide the second prompt to the machine learning model based on the triggering condition.

According to some implementations of the present disclosure, configuring the subsequent task to provide the second prompt to the machine learning model based on the triggering condition comprises: in response to determining that the triggering condition indicates the execution result of the task is to be provided at a predetermined future time point, providing the second prompt to the machine learning model. The second prompt is provided to the machine learning model based on any of: providing, at the predetermined future time point, the second prompt to the machine learning model; and providing, at a further time point determined based on the predetermined future time point, the second prompt to the machine learning model.

According to some implementations of the present disclosure, configuring the subsequent task to provide the second prompt to the machine learning model based on the triggering condition comprises: in response to determining that the triggering condition indicates the execution result of the task is to be provided when the task is completed, providing the second prompt to the machine learning model. Configuring the subsequent task further includes providing feedback for the user input, where the feedback indicates that the user input is being processed.

According to some implementations of the present disclosure, the method 700 further includes: executing the subsequent task to provide the execution result when the triggering condition is met.

According to some implementations of the present disclosure, providing the execution result when the triggering condition is met comprises: providing the execution result of the task based on a second response of the machine learning model for the second prompt.

According to some implementations of the present disclosure, the method 700 is executed at a digital assistant for accessing the machine learning model, and creating the subsequent task comprises: creating the subsequent task at the digital assistant.

According to some implementations of the present disclosure, the digital assistant further comprises a preset task that is added to the digital assistant during creation of the digital assistant. In response to determining that the preset task is activated, a determination is made of a triggering condition for the preset task. A subsequent task of the preset task is created to provide an execution result of the preset task based on the machine learning model when the triggering condition for the preset task is met.

According to some implementations of the present disclosure, the triggering condition for the preset task indicates that the execution result of the preset task is to be provided at a predetermined future time point. Creating the subsequent task of the preset task comprises: generating, based on the preset task, a third prompt indicating a task content for calling the machine learning model to execute the preset task; and configuring the subsequent task of the preset task to provide the second prompt to the machine learning model. The subsequent task of the preset task is configured to provide the second prompt according to any of: providing, at the predetermined future time point, the second prompt to the machine learning model; and providing, at a further time point determined according to the predetermined future time point, the second prompt to the machine learning model.

According to some implementations of the present disclosure, the method 700 further includes: executing the subsequent task of the preset task to provide the execution result based on a third response of the machine learning model for the third prompt.

Example Apparatus And Device

FIG. 8 illustrates a block diagram of an example apparatus 800 for processing a user task according to some implementations of the present disclosure. The apparatus 800 includes: a receiving module 810 configured to receive a user input represented in a natural language from a user, the user input indicating a task to be executed; a determination module 820 configured to determine a task type of the task based on the user input; and a creation module 830 configured to, in response to determining that the task type indicates an execution result of the task is unable to be obtained within a predetermined time period, create a subsequent task of the task to provide the execution result of the task by a machine learning model when a triggering condition for the task is met.

According to some implementations of the present disclosure, the determination module 820 includes: a first generation module configured to generate, based on the user input, a first prompt instructing the machine learning model to determine the task type; a providing module configured to provide the first prompt to the machine learning model; and a type determination module configured to determine the task type based on a first response of the machine learning model for the first prompt.

According to some implementations of the present disclosure, the first prompt further instructs the machine learning model to determine the triggering condition and a task content for the task, and the creation module 830 includes: an information determination module configured to determine, based on the first response, the triggering condition and the task content for the task; and a task creation module configured to create the subsequent task of the task based on the triggering condition and the task content.

According to some implementations of the present disclosure, the task creation module includes: a second generation module configured to generate, based on the task content, a second prompt instructing the machine learning model to execute the task content; and a configuration module configured to configure the subsequent task to provide the second prompt to the machine learning model based on the triggering condition.

According to some implementations of the present disclosure, the configuration module includes: a first providing module configured to, in response to determining that the triggering condition indicates the execution result of the task is to be provided at a predetermined future time point, provide the second prompt to the machine learning model.

According to some implementations of the present disclosure, the configuration module includes: a second providing module configured to, in response to determining that the triggering condition indicates the execution result of the task is to be provided when the task is completed, provide the second prompt to the machine learning model; and a feedback module configured to provide feedback for the user input, the feedback indicating that the user input is being processed.

According to some implementations of the present disclosure, the apparatus 800 further includes: an execution module configured to execute the subsequent task to provide the execution result when the triggering condition is met.

According to some implementations of the present disclosure, the execution module includes: a response-based providing module configured to provide the execution result of the task based on a second response of the machine learning model for the second prompt.

According to some implementations of the present disclosure, the apparatus 800 is executed at a digital assistant for accessing the machine learning model, and the creation module is further configured to create the subsequent task at the digital assistant.

According to some implementations of the present disclosure, the digital assistant further includes a preset task that is added to the digital assistant during creation, and the apparatus 800 further includes: a triggering condition determination module configured to, in response to determining that the preset task is activated, determine a triggering condition for the preset task; and a preset-based creation module configured to create a subsequent task of the preset task to provide an execution result of the preset task based on the machine learning model when the triggering condition for the preset task is met.

According to some implementations of the present disclosure, the triggering condition for the preset task indicates that the execution result of the preset task is to be provided at a predetermined future time point, and the preset-based creation module includes: a third generation module configured to generate, based on the preset task, a third prompt indicating a task content for calling the machine learning model to execute the preset task; and a preset-based providing module configured to configure the subsequent task of the preset task to provide the second prompt to the machine learning model at a future time point.

According to some implementations of the present disclosure, the apparatus 800 further includes: a preset task execution module configured to execute the subsequent task of the preset task to provide the execution result based on a third response of the machine learning model for the third prompt.

Figure 9:
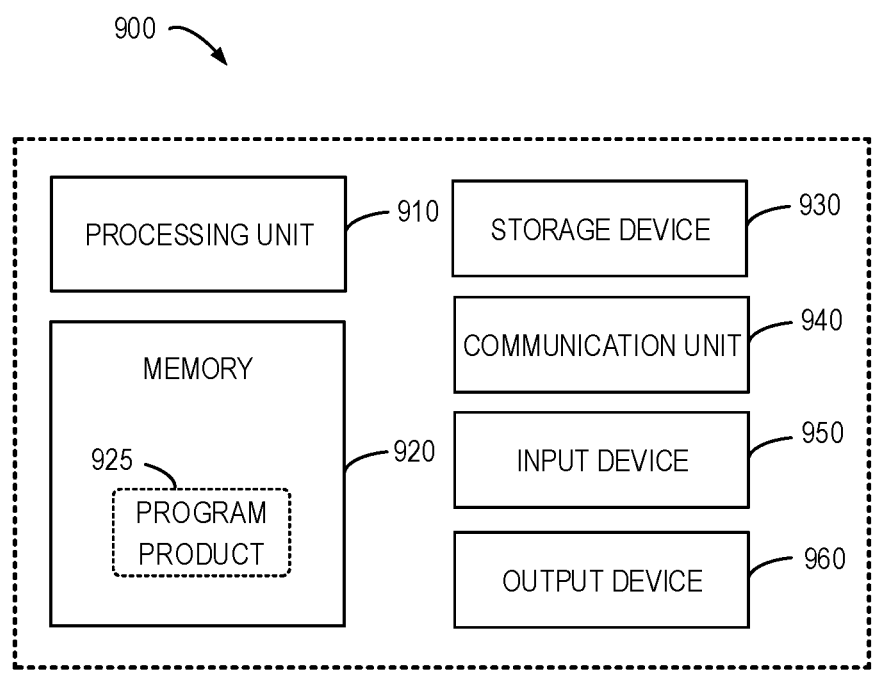
FIG. 9 illustrates a block diagram of an example device capable of implementing implementations of the present specification.

FIG. 9 illustrates a block diagram of an example device 900 capable of implementing multiple implementations of the disclosure. It should be understood that the computing device 900 shown in FIG. 9 is merely exemplary and should not constitute any limitation on the functionality and scope of the implementations described herein. The computing device 900 shown in FIG. 9 may be used to implement the methods described above.

As shown in FIG. 9, the computing device 900 is in the form of a general computing device. The components of computing device 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes based on the programs stored in the memory 920. In a multiprocessor system, multiple processing units execute computer executable instructions in parallel to improve the parallel processing capability of the computing device 900.

The computing device 900 typically includes multiple computer storage media. Such medium may be any available medium that is accessible to the computing device 900, including but not limited to volatile and non-volatile medium, removable and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 930 may be any removable or non-removable medium, and may include a machine readable medium such as a flash drive, a disk, or any other medium, which may be used to store information and/or data (such as training data for training) and may be accessed within the computing device 900.

The computing device 900 may further include additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 920 may include a computer program product 925, which has one or more program units configured to execute various methods or acts of various implementations of the present disclosure.

The communication unit 940 communicates with a further computing device through the communication medium. In addition, functions of components in the computing device 900 may be implemented by a single computing cluster or multiple computing machines, which can communicate through a communication connection. Therefore, the computing device 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The computing device 900 may also communicate with one or more external devices (not shown) through the communication unit 940 as required. The external device, such as a storage device, a display device, etc., communicate with one or more devices that enable users to interact with the computing device 900, or communicate with any device (for example, a network card, a modem, etc.) that makes the computing device 900 communicate with one or more other computing devices. Such communication may be executed via an input/output (I/O) interface (not shown).

According to the example implementations of the present disclosure, a computer-readable storage medium is provided, on which a computer-executable instruction or computer program is stored, wherein the computer-executable instructions are executed by the processor to implement the method described above. According to the example implementations of the present disclosure, a computer program product is also provided. The computer program product is physically stored on a non-transient computer-readable medium and includes computer-executable instructions, which are executed by the processor to implement the method described above. According to the exemplary implementations of the present disclosure, a computer program product is provided having stored thereon a computer program, and when the program is executed by a processor, the method described above is implemented.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be executed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that executes the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to those of ordinary skill in the art. The selection of terms used in the present disclosure aims to best explain the principles, practical application or improvement of technology in the market of each implementation, or to enable others of ordinary skill in the art to understand the various implementations disclosed herein.

In the description of the implementations of the present disclosure, the term "including" and similar terms should be understood as open-ended inclusion, that is, "including but not limited to". The term "based on" should be understood as "at least partially based on". The terms "one implementation" or "the implementation" should be understood as "at least one implementation". The term "some implementations" should be understood as "at least some implementations". The following may also include other explicit and implicit definitions. As used herein, the term "model" can represent the association relationship between various data. For example, the above-mentioned association relationship can be obtained based on various technical solutions currently known and/or to be developed in the future.

It is to be understood that data involved in the present technical solution (including but not limited to the data itself, the acquisition or use of the data) should comply with requirements of corresponding laws and regulations and relevant rules.

It is to be understood that, before applying the technical solutions disclosed in various implementations of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that execute operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

The term "in response to" used here refers to the state where the corresponding event occurs or the condition is satisfied. It will be understood that the timing of subsequent actions executed in response to the event or condition is not necessarily strongly related to the time when the event occurs or the condition is satisfied. For example, in some cases, subsequent actions can be executed immediately when the event occurs or the condition is satisfied, while in other cases, subsequent actions can be executed after a period of time after the event occurs or the condition is satisfied.

The invention claimed is:

1. A method for processing a user task, comprising:
   receiving a user input represented in a natural language format from a user during a first session between the user and a digital assistant, the user input indicating a task to be executed;
   determining a task type of the task and a first triggering condition for the task based on the user input;
   in response to determining that the task type indicates that an execution result of the task is unable to be obtained within a predetermined time period, creating a first subsequent task of the task, wherein the first subsequent task is executed by a machine learning model to provide the execution result of the task when the first triggering condition for the task is met;
   in accordance with that the first triggering condition is met, providing the execution result of the task to the user in the natural language format during a second session between the user and the digital assistant, the second session being different from the first session;
   in response to determining that a preset task corresponding to a predetermined future time point is activated, determining a second triggering condition for the preset task, the preset task being added to the digital assistant during creation of the digital assistant, the second triggering condition of the preset task indicating that an execution result of the preset task is to be provided at the predetermined future time point; and
   creating a second subsequent task of the preset task to provide the execution result of the preset task based on the machine learning model when the second triggering condition for the preset task is met.

2. The method of claim 1, wherein determining the task type comprises:
   generating, based on the user input, a first prompt instructing the machine learning model to determine the task type;
   providing the first prompt to the machine learning model; and determining the task type based on a first response of the machine learning model for the first prompt.

3. The method of claim 2, wherein the first prompt further instructs the machine learning model to determine the first triggering condition and a task content for the task, and wherein creating the first subsequent task comprises:
   determining, based on the first response, the first triggering condition and the task content for the task; and
   creating the first subsequent task of the task based on the first triggering condition and the task content.

4. The method of claim 3, wherein creating the first subsequent task of the task based on the first triggering condition and the task content comprises:
   generating, based on the task content, a second prompt instructing the machine learning model to execute the task content; and
   configuring the first subsequent task to provide the second prompt to the machine learning model based on the first triggering condition.

5. The method of claim 4, wherein configuring the first subsequent task to provide the second prompt to the machine learning model based on the first triggering condition comprises: in response to determining that the first triggering condition indicates the execution result of the task is to be provided at a predetermined future time point, providing the second prompt to the machine learning model based on any of:
   providing, at the predetermined future time point, the second prompt to the machine learning model; and
   providing, at a further time point determined based on the predetermined future time point, the second prompt to the machine learning model.

6. The method of claim 4, wherein configuring the first subsequent task to provide the second prompt to the machine learning model based on the first triggering condition comprises:
   in response to determining that the first triggering condition indicates the execution result of the task is to be provided when the task is completed, providing the second prompt to the machine learning model; and
   providing feedback for the user input, the feedback indicating that the user input is being processed.

7. The method of claim 4, further comprising: executing the first subsequent task to provide the execution result when the first triggering condition is met.

8. The method of claim 7, wherein providing the execution result when the first triggering condition is met comprises: providing the execution result of the task based on a second response of the machine learning model for the second prompt.

9. The method of claim 1, wherein the method is executed at the digital assistant for accessing the machine learning model, and wherein creating the first subsequent task comprises: creating the first subsequent task at the digital assistant.

10. The method of claim 1, wherein creating the second subsequent task of the preset task comprises:
   generating, based on the preset task, a third prompt indicating a task content for calling the machine learning model to execute the preset task; and
   configuring the second subsequent task of the preset task to provide a second prompt to the machine learning model according to any of:
   providing, at the predetermined future time point, the second prompt to the machine learning model; and providing, at a further time point determined according to the predetermined future time point, the second prompt to the machine learning model.

11. The method of claim 10, further comprising: executing the second subsequent task of the preset task to provide the execution result based on a third response of the machine learning model for the third prompt.

12. An electronic device, comprising:

at least one processing unit; and at least one memory, the at least one memory being coupled to the at least one processing unit and storing instructions for execution by the at least one processing unit, the instructions, when executed by the at least one processing unit, causing the electronic device to perform operations comprising:

receiving a user input represented in a natural language format from a user during a first session between the user and a digital assistant, the user input indicating a task to be executed;

determining a task type of the task and a first triggering condition for the task based on the user input;

in response to determining that the task type indicates that an execution result of the task is unable to be obtained within a predetermined time period, creating a first subsequent task of the task, wherein the first subsequent task is executed by a machine learning model to provide the execution result of the task when the first triggering condition for the task is met;

in accordance with that the first triggering condition is met, providing the execution result of the task to the user in the natural language format during a second session between the user and the digital assistant, the second session being different from the first session;

in response to determining that a preset task corresponding to a predetermined future time point is activated, determining a second triggering condition for the preset task, the preset task being added to the digital assistant during creation of the digital assistant, the second triggering condition of the preset task indicating that an execution result of the preset task is to be provided at the predetermined future time point; and creating a second subsequent task of the preset task to provide the execution result of the preset task based on the machine learning model when the second triggering condition for the preset task is met.

13. The device of claim 12, wherein determining the task type comprises:

generating, based on the user input, a first prompt instructing the machine learning model to determine the task type;

providing the first prompt to the machine learning model; and determining the task type based on a first response of the machine learning model for the first prompt.

14. The device of claim 13, wherein the first prompt further instructs the machine learning model to determine the first triggering condition and a task content for the task, and wherein creating the first subsequent task comprises:

determining, based on the first response, the first triggering condition and the task content for the task; and creating the first subsequent task of the task based on the first triggering condition and the task content.

15. The device of claim 14, wherein creating the first subsequent task of the task based on the first triggering condition and the task content comprises:

generating, based on the task content, a second prompt instructing the machine learning model to execute the task content; and configuring the first subsequent task to provide the second prompt to the machine learning model based on the first triggering condition.

16. The device of claim 15, wherein configuring the first subsequent task to provide the second prompt to the machine learning model based on the first triggering condition comprises: in response to determining that the first triggering condition indicates the execution result of the task is to be provided at a predetermined future time point, providing the second prompt to the machine learning model based on any of:

providing, at the predetermined future time point, the second prompt to the machine learning model; and providing, at a further time point determined based on the predetermined future time point, the second prompt to the machine learning model.

17. The device of claim 15, wherein configuring the first subsequent task to provide the second prompt to the machine learning model based on the first triggering condition comprises:

in response to determining that the first triggering condition indicates the execution result of the task is to be provided when the task is completed, providing the second prompt to the machine learning model; and providing feedback for the user input, the feedback indicating that the user input is being processed.

18. The device of claim 15, wherein the operations further comprise: executing the first subsequent task to provide the execution result when the first triggering condition is met.

19. A non-transitory computer readable storage medium having stored thereon a computer program which, when executed by one or more computers, causes the one or more computers to perform operations comprising:

receiving a user input represented in a natural language format from a user during a first session between the user and a digital assistant, the user input indicating a task to be executed;

determining a task type of the task and a first triggering condition for the task based on the user input;

in response to determining that the task type indicates that an execution result of the task is unable to be obtained within a predetermined time period, creating a first subsequent task of the task, wherein the first subsequent task is executed by a machine learning model to provide the execution result of the task when the first triggering condition for the task is met;

in accordance with that the first triggering condition is met, providing the execution result of the task to the user in the natural language format during a second session between the user and the digital assistant, the second session being different from the first session;

in response to determining that a preset task corresponding to a predetermined future time point is activated, determining a second triggering condition for the preset task, the preset task being added to the digital assistant during creation of the digital assistant, the second triggering condition of the preset task indicating that an execution result of the preset task is to be provided at the predetermined future time point; and creating a second subsequent task of the preset task to provide the execution result of the preset task based on the machine learning model when the second triggering condition for the preset task is met.

\* \* \* \* \*